United States Patent [19]

Hentschel

[11] 3,881,791
[45] May 6, 1975

[54] DRY JOURNAL BEARING
[75] Inventor: Georg Hentschel, Schweinfurt, Germany
[73] Assignee: SKF Industrial Trading and Development Company, B.V., Amsterdam, Netherlands
[22] Filed: Feb. 22, 1974
[21] Appl. No.: 444,832

[30] Foreign Application Priority Data
Mar. 2, 1973 Germany.............................. 2310592
Sept. 21, 1973 Germany.......................... 2347548
Oct. 4, 1973 Germany............................ 2349952

[52] U.S. Cl. ............................. 308/237 R; 308/238
[51] Int. Cl. ............................................. F16c 27/00
[58] Field of Search............ 308/237 R, 237 A, 238, 308/244, 122, DIG. 4, DIG. 8

[56] References Cited
UNITED STATES PATENTS
2,852,322  9/1958  Fisher ............................. 308/237 R
3,366,427  1/1968  Silver et al.......................... 308/122
3,503,820  3/1970  Galbato .......................... 308/238 X
3,616,188  10/1971  Mancel ........................... 308/238 X Primary Examiner—M. Henson Wood, Jr.
Assistant Examiner—Gene A. Church
Attorney, Agent, or Firm—Murray Schaffer

[57] ABSTRACT

A dry journal bearing for a shaft in which a housing is provided with a bore adapted to receive a shaft. A bearing strip is interposed between the shaft and the bore. The bearing strip is a planar member in its normal state which is capable of being flexed to fit the bore and conform thereto on insertion of said shaft while maintaining its restorative force.

19 Claims, 17 Drawing Figures

DRY JOURNAL BEARING

BACKGROUND OF THE INVENTION

The present invention relates to a dry journal for bearing a rotatable shaft in a housing and in particular to a dry journal having a thin resilient bearing strip interposed between the shaft and the housing.

Dry journal bearings are common for relatively rotatable shafts and housing. In general the housing is provided with a bore in which the shaft is received and a thin sheet or foil like bushing or sleeve is interposed therebetween which provides the slidable surface for rotation of one or the other. In German patent publication G.M.1,863,826 a circular sleeve bushing slit longitudinally is shoved into the bore. The sleeve is squeezed so that its longitudinal edges overlap each other on insertion, but spring back into its original circular shape so that its outer surface rests against the bore surface. A disadvantage of this construction lies in the fact that the sleeve is pre-shaped and must therefore be made to conform exactly to the bore. Further, the sleeve has no resilient spring force on the shaft.

Foil bearings are also known from U.S. Pat. No. 3,366,427 which consist of several spirally wound bearing strips. In general these are used in hydrodynamic or hydrostatic bearings where the individual strips of foil serve to improve the division and flow of lubricant. They are not, however, suitable for use as dry journals.

The known dry bearings furthermore, have several disadvantages in that unless absolute accurately dimensioned parts are assembled, free play occurs between shaft and housing, reducing the ability of the journal to absorb heavy stress loads. Furthermore, the known bearings do not readily absorb lilting or angular loads on the shaft.

A most important disadvantage of the prior art arrangements is the absence of low friction sliding surface which can both absorb radial deflection and provide smooth rotating operation.

Another disadvantage of the prior art lies in the fact that in general the housing is provided with a smooth bore, and the interposed sleeve is hard to insert and maintain in proper position. It is an object of the present invention to provide a dry journal in which each of the disadvantages and drawbacks of the prior art are overcome.

It is an object of the present invention to provide a dry journal bearing having no free play and capable of taking heavy loads and one which can moreover reliably and over long periods absorb angular tilting forces as well as radial loads on the shaft.

It is a further object of the present invention to provide a dry journal having an interposed slide member provided with improved means for enabling a low friction, high slide bearing surfaces.

In particular it is an object of the present invention to provide an interposed slide or sleeve member provided with a coated surface improving its bearing qualities, and in particular to special arrangements for the spacial disposition of these coatings.

It is another object of the present invention to further provide an improved dry journal having means for self location and maintenance of position in the housing bore.

The foregoing objects as well as other objects and advantages will be seen from the following disclosure of the illustrated forms of the present invention.

SUMMARY OF THE INVENTION

According to the present invention a dry journal for bearing a rotatable shaft, axle or the like is provided comprising a housing having a bore in which the shaft is received. A bearing strip is provided for placement between the shaft and the bore of the housing formed of a planar spring member in its normal unstressed state, which is capable of being flexed to fit in the bore and expanded to conform to the shape of the bore in the presence of the shaft while maintaining its self-restoring spring force.

The spring member when initially inserted in the bore rests against the surface of the bore, in only a partial sector of the circumference, being spaced from the surface of the bore with a crescent or sickle-shaped gap formed between them. This gap is reduced on entry of the shaft although the spring member continues to exert a force between the shaft surface and the wall, producing a resilient spring positioning of the shaft in the housing.

It is an advantageous aspect of the present invention to provide the planar spring member of a length so that the angle of contact or wrap about the shaft is greater than 360° so as to form one or more spiral turns about the shaft. As a result a maintenance free elastically prestressed, space-saving bearing is obtained.

Preferably the bearing of the present invention is easily formed at low cost by simply rolling a planar strip or band of spring-steel material having a relatively small thickness.

With the use of steel strip, at least one surface may be coated with low friction sliding material. For this purpose, use is made, preferably of polyamide or polytetrafluorethylene, which forms an elastic intermediate layer between the shaft, and the steel strip and/or between the shaft and the drilling in the housing. As a result tilting forces of the shaft can be taken up elastically. Through the use of coated steel strip there is moreover no risk of the plastic being forces out of the bore of the housing, as can be the case with journal bearing bushings that consist entirely of plastic. Furthermore, due to the very slight wall thickness of the plastic layer it is also possible to prevent the plastic from swelling even under the heat generated during operation. It is possible to note an improvement in the shear strength of bearings made of steel strip coated with plastic, compared with solid plastic bushings.

The resilient properties for absorbing tilting forces and contact points are further improved when the steel strip is coated according to the invention on both sides of its surface with sliding material of polyamide or polytetrafluorethylene. The sliding material forms in the radial direction a resilient zone or coat, while the steel strip is not deformed. In this way contact peaks are avoided and the temperature of the bearing remains low, even at high rotary speeds.

In a further advantageous form of the invention, only parial zones of the bearing strip are coated with sliding material. Furthermore, the steel strip can be coated on one side with a rubber covering of large wall thickness. For the better adhesion of the coating to the steel strip, recesses can be provided in the steel strip, into which the plastic enters from both sides, so that a burl-type joint is produced. In the region of the surface of the coating, slight recesses may be form here which serve to receive a lubricant, if desired.

According to a further aspect of the present invention plastic pads are arranged alternately (that is spaced) on the inner and outer surfaces of the bearing strip, in its peripheral direction. Preferably four plastic bearing pads are arranged on each of the inner and outer surfaces. The advantage of this construction is that it provides a spatial arrangement of coatings which preclude undesirable and unwanted bearing play.

In a still further aspect of the present inveniton means are provided to facilitate the axial insertion and maintenance of the bearing strip in the housing. Preferably the bore of the housing is provided with an annular groove at each of its axial ends and the bearing strip is bent from the plane of the strip to provide a radial lip, when flexed, at each of its axial edges which would snap into the annular groove. In a particularly preferred form the radial bending undulates to form a wavy pattern. As a result a self-locating arrangement is provided wherein the use of separate snap rings, clips or other fasteners is avoided. This is particularly advantageous since the bearing strips are formed of relatively thin steel, sometimes in the order of a fraction of a millimeter.

Full details of the present invention are given in the following description of several embodiments and in the accompanying drawings.

DESCRIPTION OF THE INVENTION

Figure 1:
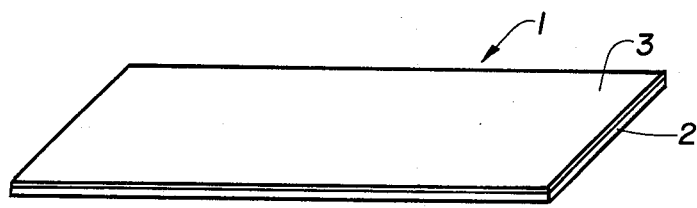
FIG. 1 shows a plane bearing strip of the present invention in the unshaped state.

Depicted in FIG. 1 is a bearing strip generally depicted by the numeral 1, formed in accordance with the present invention. The bearing strip comprises a spring steel member of planar rectangular configuration having a relatively small wall thickness. At least one surface 3 is coated with a plastic or other low friction layer. Preferably the wall thickness of the strip 2 is less than 1 mm, however, in the case of very large journal bearings steel strip of 1 or several millimeters may be used. In a practical example the strip 2 may be coated with a polyamide layer 11 on the visible surface which will later become the surface adjacent the rotatable shaft or axle. A suitable polyamide may be RILSAN (Trademark). TEFLON (Trademark) or the like may also be used.

Figure 2:
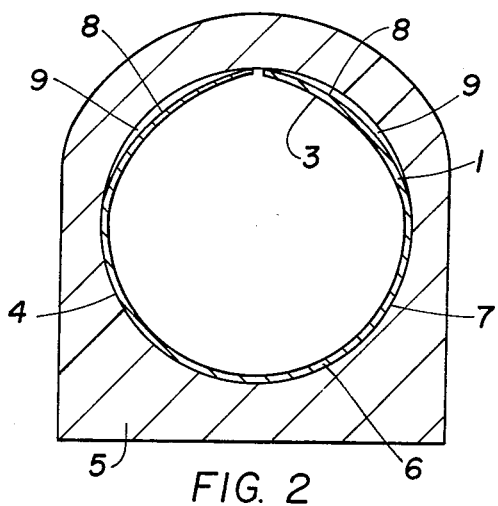
FIG. 2 is a radial section through a dry journal bearing according to the invention, without shaft.
Figure 3:
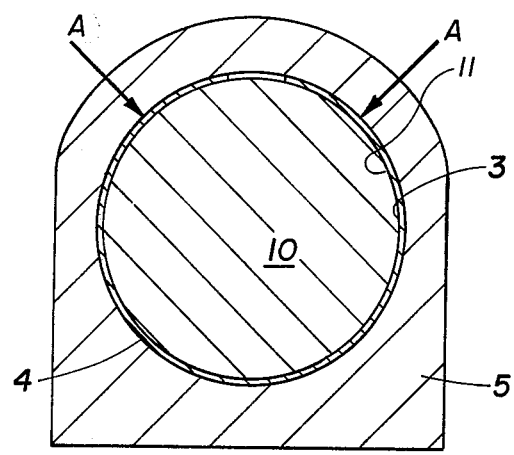
FIG. 3 is a radial section through a dry journal bearing according to FIG. 2, where a shaft is inserted in the inner surface of the bearing strip.

In FIG. 2 the bearing strip 1 is placed in the bore 4 of a housing 5. In the central zone 6 the surface 7 of the steel strip 1 rests entirely against the bore 4 of the housing, while in the region of its ends 8 there is produced between the surface 7 and the bore 4 a crescent or sicle-shaped gap 9. When inserting a shaft 10 in the inner surface 11 of the bearing strip 1 (FIG. 3), this gap 9 is made smaller, and there now occurs in the zone of the arrows A, a spring positioning of the shaft in relation to the bearing strip and the housing. The bearing strip 1 has a coating 3 such as the polyamide 11, at least on the inside. A small gap may be left between the longitudinal ends of the shaped strip.

Figure 4:
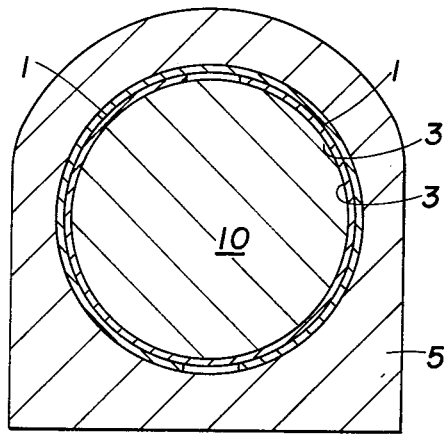
FIG. 4 is a bearing with two concentric bearing strips.

FIG. 4 shows two concentric bearing strips, each of whose inner surfaces has a coating 3.

Figure 5:
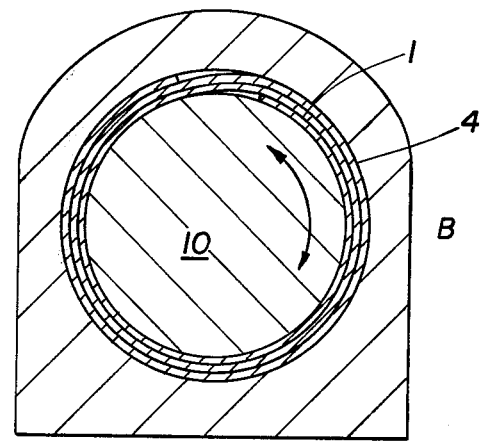
FIG. 5 is a dry journal bearing according to the invention with several spiral windings of the bearing strip.

FIG. 5 shows a further example where the angle of contact or wrap of the bearing strip is greater than 360°C to here comprise several windings about the shaft. In making this dry journal bearing the planar bearing strip 1 is wound so closely that its outer diameter is less than the diameter of the bore 4. The play or slidability of this bearing is therefore different for each of the two directions (arrow B) of rotation of the shaft. By choice of a suitable number and closeness of the windings, it can be made possible for the shaft to rotate freely in the housing in only one direction, while in the other direction of rotation, a locking action can be effected between shaft and housing, so that the bearing strip assumes the function of a clutch. By means of a slow movement of the bearing strip 1 in the drilling 4 in the housing 5, uniform bearing wear is ensured.

Figure 6:
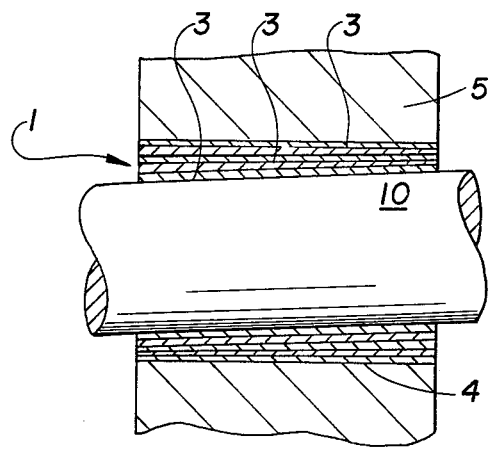
FIG. 6 shows an axial section through a dry journal bearing according to FIG. 5, under tilting stress by a shaft.

FIG. 6 shows an axial section through the dry journal bearing formed according to FIG. 5, where it may clearly be seen that the shaft 10 is tilted under load to one side. The bearing is able to adapt itself well to this load, without contact points and the attendant overheating occuring with the more conventional bearings.

Figure 7:
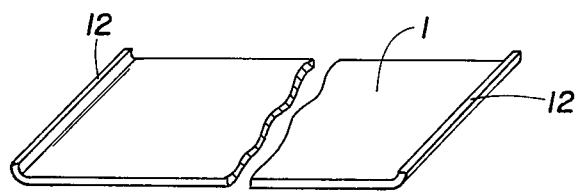
FIG. 7 shows a bearing strip according to FIG. 1, where the ends of the bearing strip are bent at an angle.

FIG. 7 shows a bearing strip 1, whose ends 12 are bent at an angle to the plane. These ends can engage in a groove in the drilling 4 and thus secure the bearing strip 1 non-rotationally in the housing as illustrated later.

Figure 8:
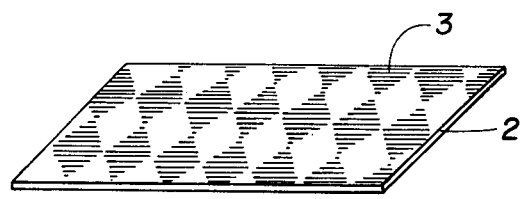
FIG. 8 shows a bearing strip according to FIG. 1, whose surface is coated with sliding material in a lozenge pattern.
Figure 9:
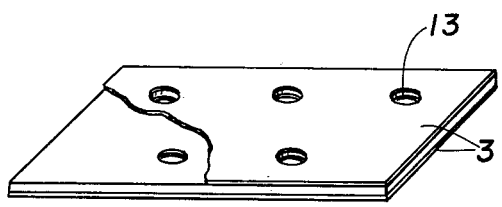
FIG. 9 shows a bearing strip with circular recesses for the improved adhesion of the coating material.
Figure 10:
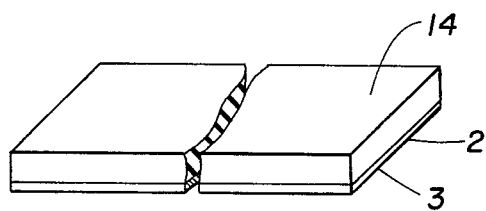
FIG. 10 shows a bearing strip which is coated on one side with rubber material.

In FIGS. 8 to 10 different forms for the bearing strip 1 are shown. The bearing strip consists in each case of a steel strip 2 of only slight wall thickness and a coating. In FIG. 8 the coating is applied on one or both sides in a lozenge pattern. In FIG. 9 the steel strip 2 has circular holes or recesses 13 which is filled by the coating 3 so it is securely held. With a coating 3 on both sides there are formed in the zone of the circular holes 13 burltype joints, so that the shearing strength of the coating is further increased. In the area of the holes 13, slight recesses may form in the surface of the coating 3, which are used for holding a lubricant. In the same way the coated surface in the cases of FIGS. 1 and 7 to 10 can also be provided with recesses in the surface which are filled with a lubricant.

FIG. 10 shows a steel strip 2 coated with a thick layer of rubber 14. If such a steel strip is incorporated according to FIGS. 3 and 4, vibration forces can be taken up by the rubber coating. Prestress between the shaft 10 and the bearing strip can be obtained by forming the shaft 10 with a slight oversize, and placing the rubber coating 14 on the surface between the steel strip 2 and the bore 4 of the housing 5. On the side facing away from the rubber the steel strip is preferably coated with the polyamide or polytetrafluorethylene layer so that the shaft 10 slides more easily.

The bearings illustrated are suitable as a journal bearing for shafts having slight oscillating movements or also as a bearing for shafts having rotary movements. As is apparent from the drawings, the bearing play can be effectively varied by the arrangement of bearing strips of differing wall thickness or by a larger or smaller number of spiral turns. It is thus possible to compensate for errors in machining of the shaft 10 or the housing 5, as well as errors of alignment between several bearings by these simple means.

The coated steel strip 2 may be supplied with the highest precision, and the application of the coating on the steel strip can be accurately made. After applying the coating the strip can be passed through a gauge to ensure the evenness of the coated layer, and the maintainance of the wall thickness, exactly.

It will be appreciated that the planar steel spring is sufficiently flexible to allow its bending into a shape approximating that of the bore of the housing, and later into the circular shape of the bore under pressure of the inserted shaft. During insertion and after placement of the shaft in the bore, the spring steel strip retains its restorative force, that is its force tending to restore it to its planar shape. This restorative force applies to the shaft a girdling encompassing sprng force, which extends over its entire peripheral surface, although basically characterized as being applied normally to the crescent or sickle-shaped gap which is created by the flat end portions of the strip before insertion of the shaft. The small space between the ends formed in the circumference of the strip after insertion of the shaft allows the strip to conform to the bore circumference without small overlap or buckling and permits the strip to move under radial, or angular load on the shaft.

The elongated strip seen in FIGS. 5 and 6 allow rotational sliding between engaging surfaces of the spiral to obtain smooth rotation and/or directional clutch effect. The multiple layers produced by the spiral overlapping provide a suitable elastic cushion easily absorbing angular loads such as seen in FIG. 6. The spiral windings of the strip may be secured together by ultrasonic welding or the like.

The spring steel strip by itself is sufficiently elastic, however, the coating of one or both of its sides with a low frictional slide material has the advantage of increasing rotational ability of the shaft and radial and angular elasticity and cushioning. The patterned effect of FIG. 8 may be varied in that any arrangement of coating patterns, eclipse, rhomboid, rectangles, diamond, etc., may be used. The holes 13 of FIG. 9 increase cushioning, while forming a strong suitable self anchor for the coating. It also provides recesses for lubrication. The rubber layer of FIG. 10 increases radial and angular resiliency without the need for spiral overlap.

It will be appreciated that the relative rotation between shaft and housing can be created by flexing the shaft and allowing the housing to rotate about it rather than rotating the shaft. Under such conditions it may be desirable to reverse not on the kinematic feature but also the constructional features such as the surface on which the coating or rubber cushions are located.

Figure 11:
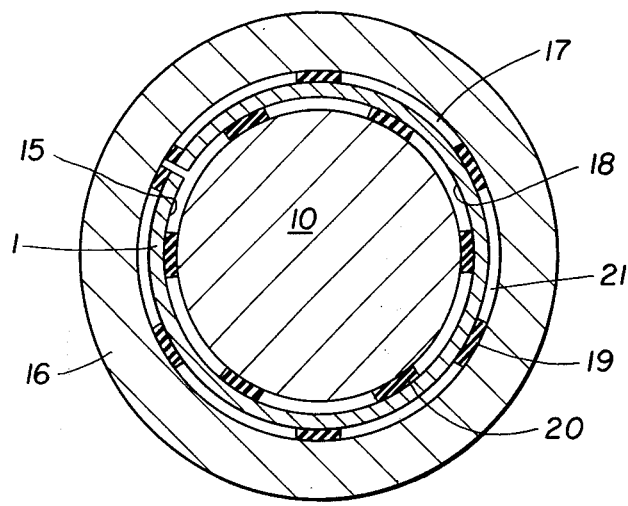
FIG. 11 is a radial section through a bearing strip according to the invention, which is inserted in a housing and in which there is a shaft.

The basic principles noted may take several forms and be improved in many ways. In FIG. 11 a plain steel spring band 1 of the type shown in FIG. 1 is inserted and expanded in the bore 15 of the bushing 16. The outside surface and the inside surface 18 of the steel spring band 1 are respectively coated with plastic pads 19 and 20 of polyamide or polytetrafluorethylene. The plastic pads 19, 20 are arranged alternately, opposite one another abut the circumference. The steel band 1 surrounds the shaft 10 which is thus supported by the plastic pads 20, which extend the length of said strip, when wound.

Opposite the plastic pads 20 the outside surface 17 of the steel band 1 is not coated, so that cavities 21 are formed. The supporting forces which are transmitted by the shaft 10 to a pad 20 are taken up respectively by the two plastic pads 19, staggered to either side of it on the outside surface 17, so that a spring girder effect is obtained. The effect is similar to a beam supported at either end and stressed by a load in the middle. Through this design, the inner diameter of the inner plastic pad 20 which is distributed over the surface of the shaft can be made smaller than the outer diameter of the shaft 10. On insertion of the shaft 10, the plastic pads 20 will spring outwardly in a radial direction, whereby securing the shaft and bushing against free play.

Figure 12:
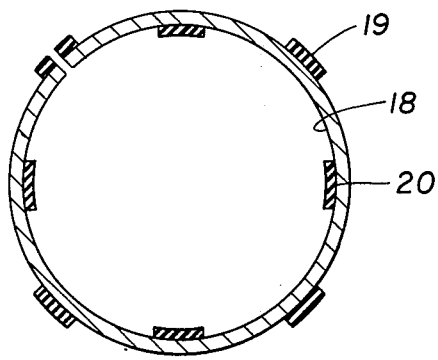
FIG. 12 shows a padded bearing strip.

In FIG. 12 the steel band or strip 1 of FIG. 11 is shown in greater detail. On the inside surface 18 as on the outside surface 17 four plastic pads 19, 20 are respectively provided. The distance between the pads 19, 20 is in each case 90°, or staggered reciprocally 45° from each other. Through this design a considerable prestress can be exerted on the shaft. The pads may be less than the length of the strip. They may also be in the nature of small pads spaced in a predefined pattern over the peripheral surface of the strip.

The construction shown in FIGS. 11 and 12 is suitable for bearing rotating shafts, or rotating bushings which are simultaneously reciprocable relative to each other. The disposition of the pads enables the girder like cushion both from an external as well as an internal direction, since all of the pads 19 are similarly bracketed on each side by a pair of pads 20. Preferably the pads 19 and 20 are respectively of uniform size. More than the four pads shown may be used so long as they are uniformly arranged in alternate staggered arrangement. The pad at adjacent edges of the strip is preferably split and apportioned accordingly as shown in FIG. 12, so that these ends are similarly mounted. The pads may be rubber, plastic of the type mentioned or similarly suitable material. Preferably, of course, the pads abutting the rotating surface should be made of the low friction easily slidable material.

Figure 13:
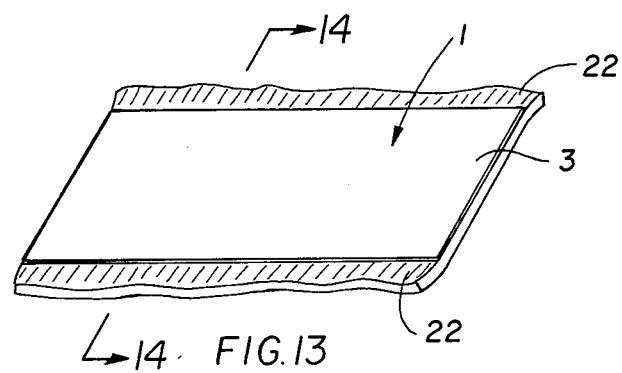
FIG. 13 shows a bearing strip according to the invention in the undeformed state.
Figure 14:
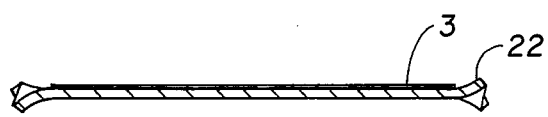
FIG. 14 is a sectional view along the line 14—14 in FIG. 13.

FIG. 13 shows a planar bearing strip 1, which consists of a steel strip of only slight wall thickness and a coating 3 of f plastic on one surface, which will be evident from FIG. 14, has its two axial ends 22 provided with a wavy shape. Such wavy ends 22 are often produced unintentionally when making very thin foil; should this not occur during the usual manufacture of steel bands, then these can be formed by rolling the ends 22 in a separate process whereby the undulating edge is obtained.

Figure 15:
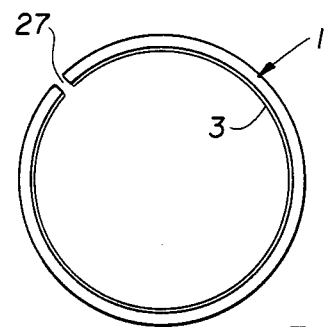
FIG. 15 shows a from view of the bearing strip, deformed.

As FIG. 15 shows, the bearing strip 1 shown in the FIGS. 13 and 14 is curved in the form of a cylinder by means of a suitable process and inserted in the similarly cylindrical bore of a housing, just as in the earlier embodiment. However, as seen in FIG. 16, the bore 25 at both terminal or end zones 24 are provided with annular grooves 26 machined on their inner surface in which the wavy ends 22 of the installed bearing strip 1 are adapted to seat.

Figure 17:
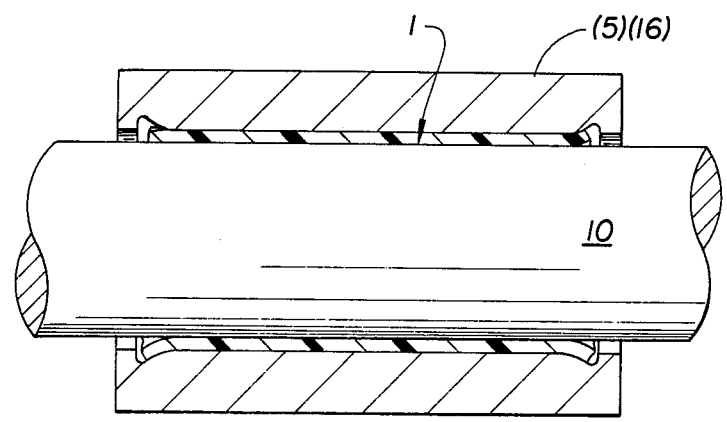
FIG. 17 shows a section according to FIG. 16 with a built-in shaft.

In FIG. 17 it will be seen that with the shaft 10 inserted, the wavy ends 22 cannot spring back from the annular grooves 26, so that the axial attachment of the bearing strip is ensured. In the case of a removable shaft the removal of the bearing strip 1 from the housing can easily be effected by it being separated at the joint 22 (cf. FIG. 15) from the support in the bore, then rolled up inwards and removed axially from the housing through either end 24.

Figure 16:
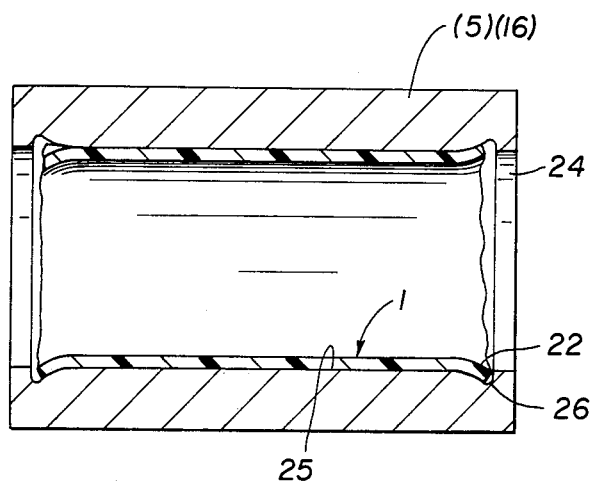
FIG. 16 shows the deformed bearing strip in the installed state without shaft.

The construction of the housing bore 25 shown in FIGS. 16 and 17 can be used as well for the bent edged steel strips illustrated earlier in FIG. 7. The edges 12 of this figure will easily seat in a groove in the bore 25 in the manner just described.

With the construction shown in FIG. 7 or in FIG. 13, the spring steel band or strip is easily inserted and thereafter maintained against axial dislodgement during operation of the shaft. It is also possible to obtain a similarly useful effect by providing an annular groove at only one end of the cylindrical bore. In other respects the bearing strip or band shown in FIGS. 13–17 can be constructed in accordance with any one of the previously illustrated forms, and they function similarly as well.

Various forms and embodiments have been illustrated and suggested herein, others will be obvious to those skilled in this art. It is therefore intended that the present disclosure be taken as illustrative only and not as limiting the scope of the invention.

What is claimed:

1. A dry journal bearing for a shaft comprising a housing having a bore adapted to receive said shaft and a bearing strip adapted to be interposed between the shaft and said bore, said bearing strip comprising a planar member in its normal state capable of being flexed to fit said bore and conform thereto on insertion of said shaft while maintaining its restorative force.

2. The dry journal bearing according to claim 1 wherein said strip is formed of spring steel.

3. The dry journal bearing according to claim 1 wherein the thickness of said strip is relative to length and width.

4. The dry journal bearing according to claim 1 wherein at least one surface of said strip is at least coated in part with a slidable material.

5. The dry journal bearing according to claim 4 wherein said coating extends over the entire surface of at least one side of said strip.

6. The dry journal bearing according to claim 4 wherein each side of said strip is coated.

7. The dry journal bearing according to claim 4 wherein said coating is applied in predetermined patterned arrangement.

8. The dry journal bearing according to claim 1 wherein one surface of said strip is provided with elastic material of substantially greater thickness.

9. The dry journal bearing according to claim 1 wherein on surface of said strip is coated at least in part with a low friction material and the other side of said strip is provided at least in part with thick elastic material.

10. The dry journal bearing according to claim 1 wherein said strip has a length sufficient so that when inserted in the bore the angle of contact is such that the strip wraps about the shaft in greater than 360°.

11. The dry journal bearing according to claim 10 wherein said strip is wound spirally about the shaft.

12. The dry journal bearing according to claim 11 wherein the windings of said strip are welded ultrasonically.

13. The dry journal bearing according to claim 1 wherein at least one surface of said strip is provided with a plurality of elastic pads spaced uniformly from each other.

14. The dry journal bearing according to claim 13 wherein said pads extend the length of said strip.

15. The dry journal bearing according to claim 13 wherein said pads are provided on both surfaces, the pads of one surface being offset in staggered relationship with the pads on the other surface.

16. The dry journal bearing according to claim 15 wherein four pads, extending the length of the strip are arranged on each side of the strip uniformly about its periphery.

17. The dry journal bearing according to claim 1 wherein said strip is bent out of the plane thereof along at least one end, and the bore of said housing is provided with a groove at at least one end for receiving the same.

18. The dry journal bearing according to claim 17 wherein the strip is bent at each end.

19. The dry journal bearing according to claim 17 wherein the bent edge of said strip is undulated.

* * * * *